E. HUWART.
APPARATUS FOR THE PREPARATION OF FORMALDEHYDE.
APPLICATION FILED JUNE 25, 1908.

961,721.

Patented June 14, 1910.

Witnesses:
C. C. Fuss.
H. D. Penney

Inventor:
Edouard Huwart,
By his Attorney,
F. H. Richards.

UNITED STATES PATENT OFFICE.

EDOUARD HUWART, OF LIEGE, BELGIUM.

APPARATUS FOR THE PREPARATION OF FORMALDEHYDE.

961,721. Specification of Letters Patent. Patented June 14, 1910.

Original application filed December 11, 1907, Serial No. 405,995. Divided and this application filed June 25, 1908. Serial No. 440,246.

*To all whom it may concern:*

Be it known that I, EDOUARD HUWART, a subject of the Kingdom of Belgium, residing in Liege, Belgium, have invented certain new and useful Improvements in Apparatus for the Preparation of Formaldehyde, of which the following is a specification.

This invention relates to an apparatus for the preparation of formaldehyde; and has for its object to provide means for passing a heated vapor through trioxymethylene in intimate relation therewith.

A further object of the invention is to cause the generation of superheated steam that is brought into intimate relation with trioxymethylene to generate formaldehyde.

This application is a division of an application of mine filed December 11th, 1907, Serial No. 405,995.

One embodiment of my invention is shown in the accompanying drawing representing in vertical section the apparatus, in which—

Figure 1:
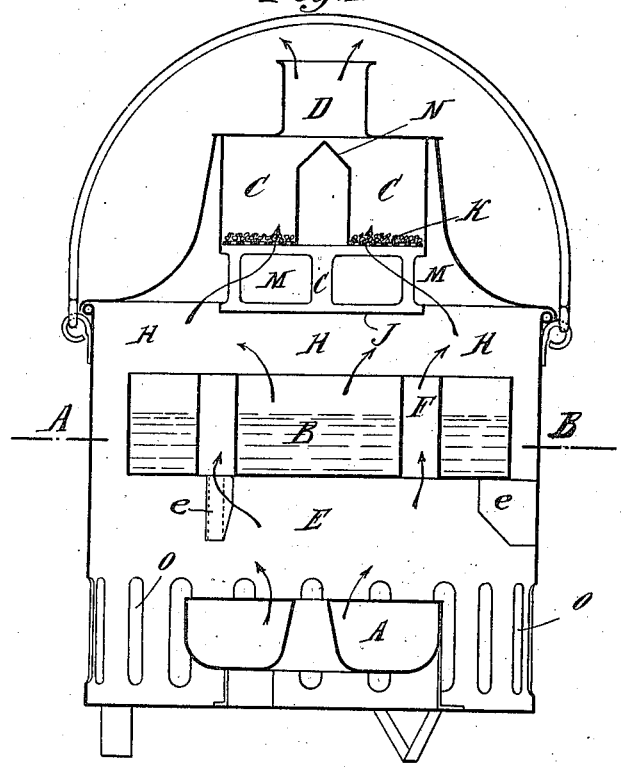
Figure 2:
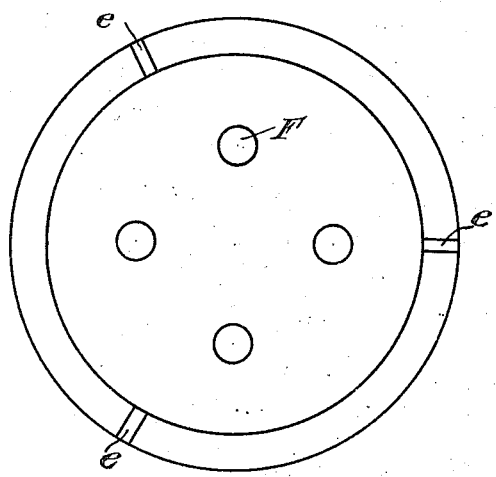

Figure 1 is a vertical section, and Fig. 2 a transverse section on the line A—B of Fig. 1.

A suitable vessel E has a pan A at the lower part thereof in which may be placed any desired liquid or other substance for producing heat. Above the pan A is placed a vessel B supported by brackets e which vessel is for the purpose of containing water to have steam generated from the source of heat at A. The vessel is shown provided with passages F for the passage therethrough of the vapors of combustion from the source of heat. At the upper part of the vessel E, is a receptacle C whose bottom K contains minute openings, on which bottom is placed the particles of trioxymethylene. The steam from the boiler B passing upward, will meet with the vapors of combustion from A by which the steam will be superheated and these will pass upward to the bottom K of the vessel C. The latter is protected by a deflector plate J from unduly heating that might ignite the particles on the bottom K. By this means the superheated steam will intimately engage the particles of trioxymethylene in the vessel C and will generate the formaldehyde, that will pass upward through the chimney D. The vessel E has openings O in its lower portion for admitting air to support the combustion in the vessel A. By this means it will be seen that the formaldehyde will be generated by the action on the trioxymethylene of the superheated steam, and the latter will absorb much of the heat of the vapors from the vessel A and prevent unduly heating of the trioxymethylene in the vessel C and prevent the latter from becoming ignited.

Having thus described my invention, I claim:

1. The combination of a vessel having openings at its lower part, a receptacle for a source of heat in the lower part of the vessel, a water receptacle in the vessel above the source of heat and opening into the vessel for delivering vapor into the vessel, and a receptacle for the generative substance in the vessel located above the water vessel, the latter receptacle having minute openings in its bottom through which said vapors from the water will pass.

2. The combination of a vessel having openings at its lower part, a receptacle for a source of heat in the lower part of the vessel, a water receptacle at the intermediate part of the vessel having passages therethrough, a receptacle for the generative substance above the water vessel, the receptacle having minute openings in its bottom, and a deflector plate immediately below said bottom of the latter receptacle.

EDOUARD HUWART.

Witnesses:
GEORGES VANDER HAEGHEN,
LEONARD LÉVA.